United States Patent Office 3,486,107
Patented Dec. 23, 1969

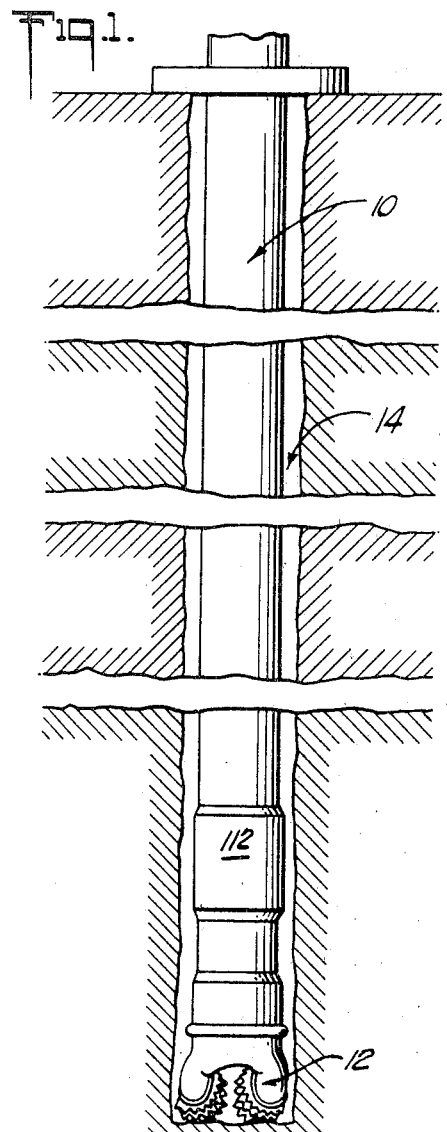
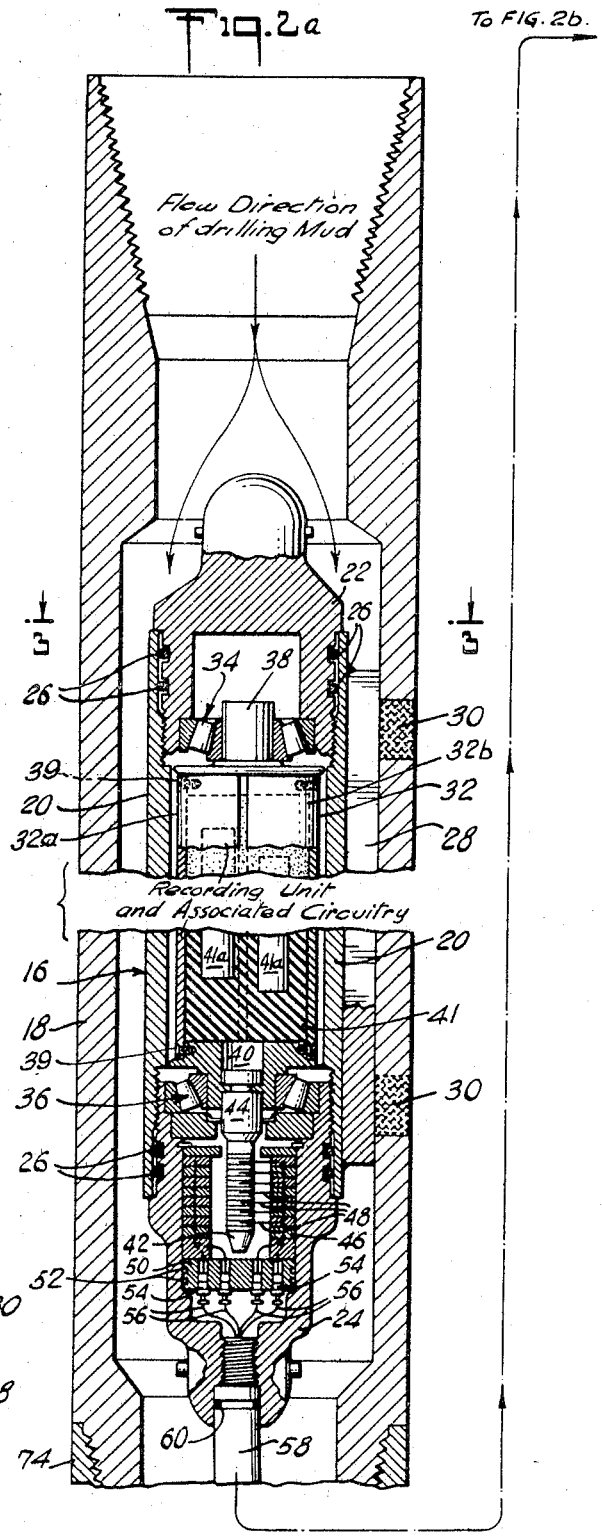
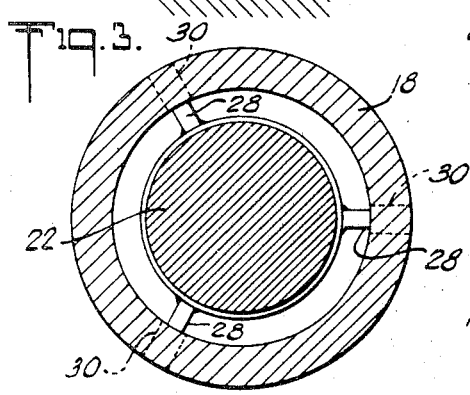

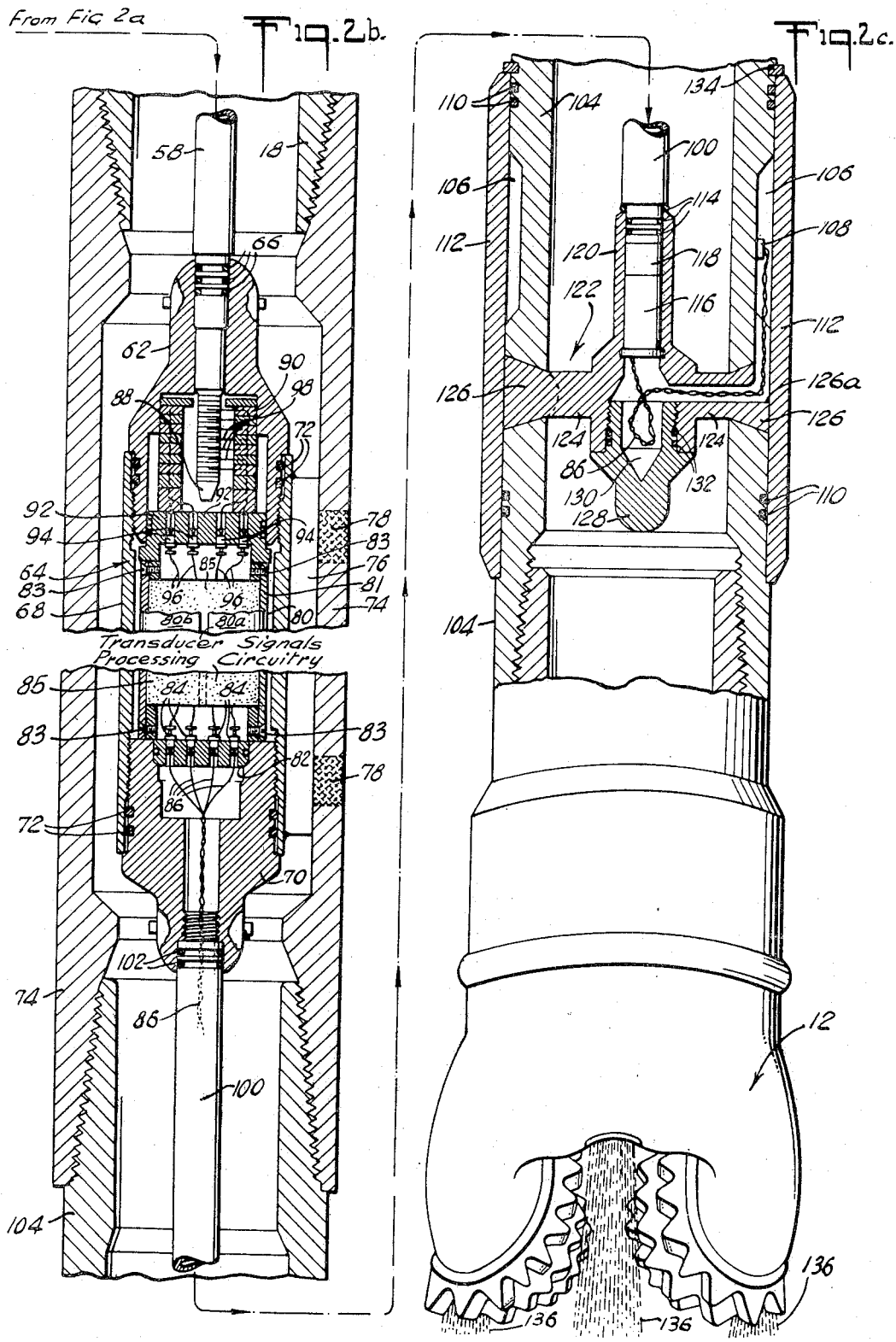

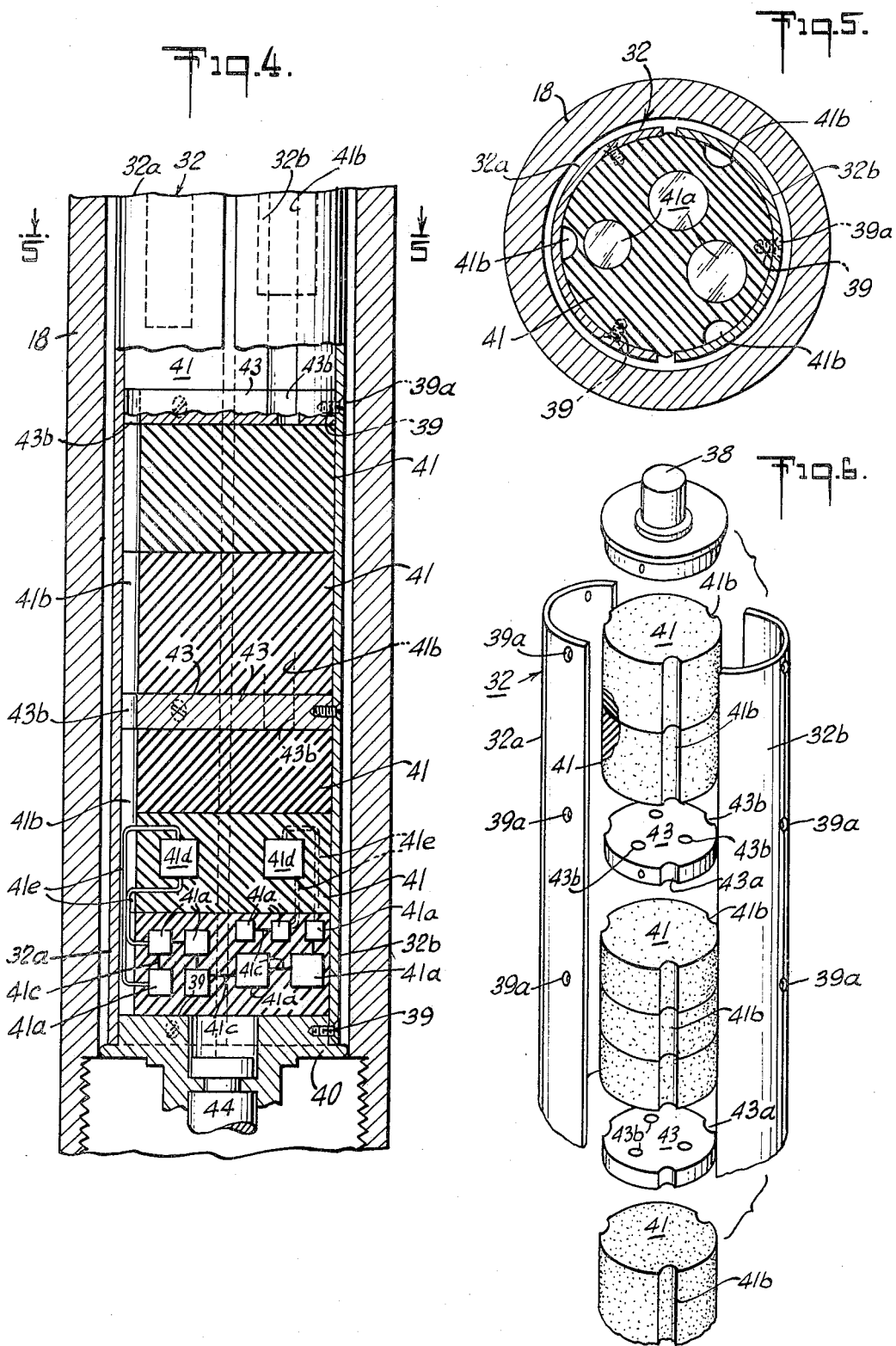

3,486,107
LOGGING WHILE DRILLING APPARATUS EMPLOYING POTTED ELECTRONIC COMPONENTS
Albert P. Richter, Jr., and James D. Bruner, Houston, Tex., assignors to Texaco Inc., New York, N.Y., a corporation of Delaware
Filed Nov. 24, 1967, Ser. No. 685,568
Int. Cl. G01v 3/18
U.S. Cl. 324—1　　　　　　　　　　　　　　　　　1 Claim

ABSTRACT OF THE DISCLOSURE

Groups of delicate logging components (e.g., electronic circuit elements, batteries, etc.) are embedded, or potted, in dielectric elastic matrices in the form of relatively short cylindrical bodies. Groups of these bodies are longitudinally stacked end-to-end to form longer cylindrical bodies which may also be longitudinally stacked end-to-end or longitudinally separated by apertured steel discs. The stacked bodies are electrically interconnected, as needed, by electrical conductors; said conductors passing, as needed, through the apertures in the steel discs. The stacked array of bodies and discs form a long unitary cylindrical body which is located between two long steel sleeves which exert radial pressure on the dielectric elastic matrix material. The sleeved unitary body is then housed in a capsule which is incorporated in a drill string. Being packaged as aforesaid, the delicate components are better able to withstand the intense vibrational forces experienced as the drill string penetrates various earth formations.

BACKGROUND OF THE INVENTION

This invention pertains, in general, to apparatus for logging an earth borehole simultaneously with the drilling of the borehole; and, more particularly, to borehole logging equipment including structurally delicate elements, or components, which are packaged in a new and improved way in order that such delicate components may be protected from damage due to, among other things, violent vibrational forces during the drilling operation and also to simplify the assembly and replacement of various components when different parameters determined in the borehole are to be detected, measured and recorded.

Often while seeking sub-surface oil, gas or minerals and the drilling of an earth borehole is in progress it is necessary to both obtain and record measurements of various parameters, in situ; i.e., the detection, measurement and recording are all done downhole, in the borehole, while the drilling operation is in progress. For example, the following measurements, among others, have been found to be very useful; drilling mud pressures; mud weight; vibration; weight on the drill bit; drill bit torque; stresses and strains on the drill collar and drill pipe; borehole deviation; various parameters relating to the formations penetrated by the drill bit, such as electrical resistivity and spontaneous potential; temperatures; etc. Methods and apparatus for detecting, measuring and recording various parameters in situ, within the borehole while the drill bit is rotating and penetrating the various earth formations are disclosed in, among others, the following U.S. patents: 3,149,683 issued Sept. 22, 1964, to R. J. Clements et al.; 3,134,069 issued May 19, 1964, to R. J. Clements et al.; and 3,209,323 issued Sept. 28, 1965, to G. J. Grossman, Jr.

As the drill string and the drill bit rotate and penetrate the various earth formations the simultaneously functioning logging equipment located in the vicinity of the drill bit is subjected to vibration. The rotary motion, among other motions, of the drill bit often subject the logging equipment to violent shocks and impact forces. The logging equipment includes structurally and operationally sensitive elements, or components, which are relatively delicate, structurally, as compared with the massive drill pipe, drill collars, subs and the drill bit. For example, the logging equipment may be comprised of electric batteries or another power source; electrical and electronic circuitry including relays; slip ring assemblies, vacuum tubes, transistors, semi-conductor diodes or the like; various detectors, sensors or transducers such as strain gauges, piezoelectric crystals or the like; electrodes, a recording instrument such as, for example, a magnetic tape recording unit; etc.

Clearly, in order to detect, measure and record various parameters down in the borehole while the drilling operation is in progress, it is necessary to have suitable housings or packagings for the aforementioned delicate instrumentation components if such components are to survive the hostile environment.

In addition to the aforesaid violent vibrational forces it has been found on occasion that an internal failure of one or more of the batteries would cause a rupture of the battery casing or casings and the contents thereof would contaminate many of the delicate and sensitive electronic components.

In addition to the damage done to the aforementioned delicate components occasioned by the violent vibrational forces and battery leakage, the prior art arrangement of the various components comprising the logging equipment was such that it was difficult to fabricate, assemble and reassemble, when necessary, the various components of the logging equipment. Heretofore, the logging equipment comprising, among others, the foregoing elements or components were housed in a single rather long and massive sealed housing or capsule which was designed to withstand very high pressures and which was secured coaxially within drill collars or special subs in the drill string. The various logging elements or components were usually stacked in series vertically at different levels longitudinally within the interior of the long sealed capsule. A support assembly comprising of a series of spaced-apart vertically stacked plates or discs connected together by vertical support rods was used to support the various elements and components. The elements or components are secured to the aforesaid support assembly and the support assembly is, in turn, secured within the capsule. The sealed capsule containing all of the logging equipment hereinbefore described was secured coaxially within a special sub or serially coupled subs above the drill bit by means of bosses or studs which projected radially outward from the outside wall surface of the capsule to the inner surface of the sub. Not only was the capsule packed with all of the logging equipment difficult to fabricate and assemble, but it had to be completely rebuilt or reassembled every time different borehole parameters were to be measured. For example, different transducers and electronic circuitry for processing transducer signals had to be substituted into the capsule after other parameter detecting transducers and circuitry, among other things, were removed when a different measurement was to be made. This was of course an expensive and time consuming task.

SUMMARY OF THE INVENTION

One object of the invention is to provide new and improved earth borehole logging apparatus which is better able to withstand the aforesaid hostile environment occasioned while drilling is in progress in order to eliminate, or at least substantially minimize, damage to the logging equipment including the various logging elements or components thereof.

Another object of the invention is to prevent the vibrational damage to the various components or elements of logging equipment.

Another object of the invention is to prevent ruptured cells or batteries from damaging other elements or components of logging equipment.

Another object of the invention is to provide well logging equipment or apparatus which is relatively easy, as compared with prior art apparatus, to fabricate and assemble.

Another object of the invention is to provide borehole logging apparatus which, as compared with prior art apparatus, is easily and quickly maintained, repaired and reassembled as the need arises.

Another object of the invention is to provide borehole logging apparatus wherein the arrangement of the various components or elements of the apparatus provides easy access to the various components or groups of components in the event that they need to be changed or replaced for the purpose of making different measurements of different parameters in the borehole.

In accordance with an illustrative embodiment of the invention there is mounted within a sealed capsule a pair of longitudinal sleeves which form a split tubular container. A cross section transversely through the split tube or tubes would show two opposing semi-circular sleeves. Within each split tube there is housed the various logging elements or components. Suitable means such as plates, discs, or rings are employed to stiffen the split tubes and also to divide the split tube into a number of compartments for housing such elements and components as the recording unit, batteries, transducers, electronic or electrical components and associated electrical circuitry, etc. With the exception of the recording unit, among other things, the aforementioned elements or components are embedded or "plotted" in a dielectric elastic material which serves as both an electrical insulating and shock absorbing material. Various groups of the aforementioned components are embedded in the matrix which is in the form of a short cylindrical body for each of the groups or modules of components. When these cylindrical bodies are stacked end to end, they form a relatively long cylinder of dielectric material. This long cylinder of dielectric material is situated within the aforementioned longitudinal split tube and each of the short cylindrical bodies is electrically interconnected as necessary by means of suitable electrically conductive wires. The long cylinder of dielectric elastic material is held under radial pressure between the two sections of the longitudinally split tube which squeeze the long elastic cylinder holding it securely within the tube. At suitable intervals within the longitudinal tube, suitable means such as plates, discs, or rings are employed to stiffen the split tube and also to divide its interior into a number of compartments for housing various sections of the stacked short cylindrical bodies. Apertures are provided in these plates, discs, or rings to permit wiring passages or conduits so that the components in the various bodies may be electrically interconnected.

One feature of the invention resides in the use of a dielectric elastic potting compound within which the various logging elements or components are embedded and are thereby electrically insulated as well as cushioned against shocks and impacts.

Another feature of the invention resides in stacking short cylindrical bodies or modules of various portions of the components or elements such that as necessary such changes and replacements as are needed may be quickly and easily carried out.

Another feature of the invention resides in the use of compartmented longitudinally split tubes for housing and supporting the aforementioned potted logging elements or components, the split tubing compressing the potted material sufficiently to securely hold the potted components in their respective compartments.

Other objects, features and advantages of the invention are pointed out with particularity in the claims annexed hereto and forming part of the specification. For a clearer understanding of the invention, its operating advantages, and the specific object obtained by its use reference should be had to the accompanying drawing figures and descriptive matter in which there is illustrated and described a preferred embodiment of the invention.

BRIEF DESCRIPTION OF THE DRAWINGS

FIG. 1 is an elevation view showing a rotary drilling apparatus penetrating various earth formations during the drilling of an earth borehole; said apparatus including the apparatus according to the present invention.

FIGS. 2a, 2b and 2c are cross-sectional elevation views of different sections of the lower end of the drilling apparatus of FIG. 1, and including the rotary drill bit of the apparatus of FIG. 1; FIG. 2a showing the uppermost section; FIG. 2b showing the next lower section; and, FIG. 2c showing the lowermost section below FIG. 2b.

FIG. 3 is a cross-section view taken along the section line 3—3 of FIG. 2a.

FIG. 4 is an enlarged cross-section showing the details of the recording unit and associated circuitry as housed in FIG. 2a.

FIG. 5 is a cross-section taken on the section line 5—5 taken in FIG. 4.

FIG. 6 is an exploded view in perspective of the various components shown in FIG. 4.

DESCRIPTION OF THE PREFERRED EMBODIMENT

Throughout the drawing figures like elements or components are designated by the same reference numbers.

In FIG. 1 there is shown a drill string 10 which is made up of, among other things, a series of drill pipes connected end to end. Located at the lowermost end of the drill string 10 is a conventional rotary drill bit 12. As shown in FIG. 1, drill bit 12 has rotatably drilled an earth borehole 14 which traverses various earth formations.

Referring now to FIG. 2a there illustrated is a capsule designated generally by the reference number 16. The capsule 16 houses a recording unit and associated circuitry. Capsule 16 is a sealed container adapted to withstand pressures of about 14,000 lbs. per square inch, or more. As shown capsule 16 is located coaxially within a special sub 18 which is a drill collar that has been hollowed out for the purpose of receiving capsule 16. Capsule 16 is comprised of a tubular member 20 of steel or another suitable high strength material. The tubular member 20 is internally threaded near its upper and lower ends. The internal threads are for the purpose of receiving external threads formed on end caps or bull plugs 22 and 24 respectively. These bull plugs 22 and 24 close the upper and lower ends of tubular member 20. Each end cap or bull plug 20 and 24 has two annular recesses formed in the outer surfaces thereof and each of these annular recesses contain the O-rings 26. As shown in FIG. 2a, the O-rings 26 effectively seal capsule 16 so that drilling fluid, or drilling mud, flowing through the special sub 18 in the direction indicated cannot enter the capsule 16; the direction of drilling mud flow being indicated by the labeled arrows in FIG. 2a.

Capsule 16 is mounted within the special sub 18 by means of three longitudinal members or runners 28 which are welded to the outside surface of tubular member 20 along substantially the entire length thereof. (See FIGS. 2a and 3.) Runners 28 are welded to the wall of sub 18 through a number of holes machined through the wall of sub 18. These welds are designated by the reference numbers 30 in FIG. 2a.

Located within tubular member 20 is another tubular container, designated generally by reference number 32, in which there is situated the recording unit and its associated circuitry. Container 32 is mounted for rotation about its own longitudinal axis by means of two sets of tapered roller bearings 34 and 36 which are located at the upper and lower ends, respectively, of the container 32. This arrangement is advantageous in that the recording unit and its associated circuitry within container 32 will not be subject to the forces occasioned by sudden angular acceleration or deceleration of the rotating drill string and drill bit. A cylindrical shaft 38 at the uppermost end of container 32 is journaled for rotation in bearing member 34. Similarly, the lower end of container 32 is provided with an end cap having a cylindrical shaft 40. Cylindrical shaft 40 is hollow and is adapted to receive the male portion 42 of a slip ring assembly, the male portion 42 having an enlarged cylindrical shaft portion 44, which, as indicated, is journaled for rotation in the bearing member 36. The male portion 42 of the slip ring assembly is free to rotate in unison with container 32 and the shaft 40. The male portion 42 of the slip ring assembly has an internal cavity therein carrying wiring which communicated with container 32 and with the recording unit and associated circuitry therein. The slip ring assembly also has a female portion 46. Wires from the static or non-mobile female portion 46 is transferred electrically via electrical contacts 48 to the male or rotating portion 42. Situated below female portion 46 is a block 50 in cylindrical form which houses various terminals. As indicated cylindrical block 50 is provided with annular recesses containing O-rings 52. As shown in FIG. 2a, the cylindrical block 50 is provided with a plurality of terminal members 54. Electrically connected to the various terminal members 54 are the electrical conductors 56 which, in turn, electrically communicate through the terminals 54 to female portion 46 from whence signals are translated to the electrical contacts 48 and thence to the male portion 42 of the slip ring assembly. On the outer surface of the male slip ring portion 42 there is provided a plurality of electrically conductive rings which ultimately provide electrical communication between conductors 56 and the recording unit together with its associated electronic circuitry within container 32.

Conductors 56 pass through a conduit 58 which is connected to end cap 24. The end of conduit 58 which is connected with end cap 54 is provided with an annular groove in which there is located another sealing O-ring 60.

As shown in FIG. 2b, conduit 58 enters the end cap 62 of another sealed capsule 64. Capsule 64 houses transducer signals processing circuitry. As shown conduit 58 at the point where it fits into end cap 62 has three annular recesses therein in which there are located the O-rings 66. Capsule 64 is comprised of a tubular member 68 which is internally threaded at its upper and lower ends in order to receive the end cap or bull plug 62 as well as an end cap or bull plug 70. Bull plug 62 and 70 are provided with annular recesses for receiving sealing O-rings 72. Capsule 64 is located coaxially within a special sub 74, which is similar to the special sub 18 hereinbefore described in detail. As indicated in FIGS. 2a and 2b, the special subs 18 and 74 are threadably coupled together by means of standard API threads. The tubular member 68 is coaxially mounted within the special sub 74 by three welded longitudinal runners 76 in the same manner as the runners 28 support the tubular member 20 within special sub 18. Welds 78, which are similar to the welds 30 formed in the special sub 18, support runners 76 on the special sub 74.

As shown in FIG. 2b, there is situated within the tubular member 68 of capsule 64 another tubular container 80, like container 32, in which there is located circuitry for processing transducer signals, which signals are ultimately transmitted to the capsule 16 wherein they are processed and recorded. Situated immediately below container 80 is a cylindrical disc 82 on which there is mounted a plurality of electrical terminal members 84. Electrical conductors 86 are connected to these terminals 84 and are ultimately coupled to the transducer signal processing circuitry in container 80.

Situated within and at the uppermost end of the capsule 64 there is located another slip ring assembly comprising a male slip ring portion 88 and a female slip ring portion 90. The male slip ring portion 88 has a hollow interior including, among other things, wires within which are received in the communication conduit 58 and carried through ultimately to the recorder capsule 16.

The male slip ring portion 88 is an extension of the conduit 58. The male slip ring portion 88 being fitted to the lowermost end of conduit 58 as shown. Situated below the female slip ring portion 90 is a header 92 in cylindrical form which houses electrical terminals 94. These terminals 94 receive the electrical transducer signals from conductors 96 and transmit them via slip ring portions 90 and 88 to conductors 56 and ultimately to capsule 16.

The bull plug 70 rigidly mounts the container 80 to capsule 64 by screws. The header 92 serves a number of purposes: first, it aids in guiding the housing 80 into the end cap 62 during makeup of the instrument and supports the instrument after makeup; second, it supports the female slip ring portion 90 and; third, it provides a bulkhead seal for the instrument compartment. Container 80 is mechanically attached with screws to the end cap 70. The members 50, 92 and 82 serve as bulkheads and these bulkheads serve to protect the instrument container should the O-rings on the conduits fail.

The conductors 96 transmit signals from container 80 to female part 90 and, then, through male part 88 to the conductors 56 contained within the conduit 58 and then ultimately to the recorder capsule 16 containing the recording unit and its associated circuitry. Communication between the female slip ring portion 90 and the male slip ring portion 88 is accomplished by electrical contacts 98 extending from female slip ring portion 90 to the male slip ring portion 88.

The lower bull plug 70 shown in FIG. 2b has an aperture therein which is internally threaded as indicated to receive the externally threaded portion of a conduit 100. In order to prevent the drilling mud from entering and contaminating the capsule 64, the conduit 100 is provided with two annular recesses which contain O-rings 102. The conduit 100 also carries therewithin the electrical conductors 86 which are connected to terminals 84 on the disc 82. As shown in FIGS. 2b and 2c, the special sub 74 is connected at one end to the special sub 18 (FIG. 2a) and at its lower end to another special sub 104. Special subs 74 and 104 are connected, as shown, with a conventional threaded API tool joint. Special sub 104 has the outside surface thereof provided with an annular cavity 106. Annular cavity 106 has mounted therein one or more transducers designated generally by the reference number 108.

The transducer or transducers 108 have the conductors 86 as shown in FIGS. 2b and 2c connected thereto and run through conduit 100 into the capsule 64. The transducer or transducers 108 may, for example, be strain gauges arranged for measuring weight on the bit 12 as well as for measuring static and dynamic torque on the special sub 104 or bit 12. The arrangement of the transducer or transducers 108 may be of a bridge type configuration which appropriately placed on the wall of cavity 106 of special sub 104 provides signals representative of the various parameters hereinbefore mentioned.

Referring again to FIG. 2c special sub 104 has at its uppermost and lowermost end two annular recesses in which there are located the O-ring seals 110. Fitted over the outside surface of special sub 104 is a cylindrical member 112 which covers cavity 106 as well as the transducers therein. At the lowermost end of conduct 100 there is provided two annular recesses in which there is located O-ring seals 114. Situated at the bottom of conduit 100 is an electrical connector assembly comprising male and female portions 116 and 118 respectively. Electrical conductors 86 are carried via conduit 100 and connected to the female connector portion 118 from whence they are electrically connected to the male connector portion 116. From the male portion 116 conductors 86 run to the transducer configuration 108. The male and female connectors 116 and 118 situated within a cylindrical portion 120 of a coaxially located spider-like member 122, which member is, in turn, coaxially located within special sub 104. The spider-like member 122 has a plurality of radially extending arms 124 which are rigidly connected to the wall of special sub 104. The radially extending arms 124 are secured to the wall of special sub 104 by means of the welds 126. As shown in FIG. 2c, one of the welds 126 and radial arms 124 has a hole 126a drilled therethrough in order that the conductors 86 may communicate with the male connector 116. The lowermost end of the spider-like member 122 is internally threaded and thereby adapted to receive an externally threaded end cap 128. End cap 128 has therewithin a cavity 130 which allows for some slack in the conductors 86. Also, end cap 128 is provided with two annular recesses which contain the sealing O-rings 132.

After mounting transducers 108 in cavity 106 on the external wall portion of special sub 104, the outer cylindrical member 112 is slipped over the outside surface of special 112 from the top in accordance with the orientation shown in FIG. 2c. As is indicated in FIG. 2c, the lowermost end of the cylindrical member 112 abuts against an external land provided in the outside surface of the lower end of the sub 104. In order, however, to secure the cylindrical member 112 to the outer surface of the sub 104 there is provided the retaining ring 134. With an appropriate tool, the split ring 134 may be expanded and then slipped over the outside surface of special sub 104, then brought to rest on the outermost surface of the cylindrical member 112 and the ring 134, when contracted, will be received in the indicated recess provided.

As shown in FIG. 2c, drilling fluid 136 emanates from the lowermost portion of drill bit 12 through apertures provided in the drill bit and upon exiting into the borehole the drilling fluid returns upwardly between the surface of the borehole 14 and the outside surface of drill string 10.

The packaging arrangement according to the invention is illustrated in more detail in FIGS. 4, 5 and 6. As shown in FIGS. 4, 5 and 6, the tubular container designated generally by the reference number 32 is comprised of the two sleeves 32a and 32b, each of which has a generally semi-circular cross-section. As shown the sleeves are provided with a plurality of counter-sunk holes 39a. As will be appreciated from the discussion hereinafter appearing the holes 39a are for the purpose of receiving the screws 39. As shown in the drawings a plurality of generally cylindrical bodies 41 formed of a dielectric elastic material such as, for example, Sylgard made by Dow Corning are stacked to form longer cylindrical bodies. Embedded within each of the cylindrical bodies 41 is one or more of the elements or components comprising the logging equipment. Each module or cylindrical body 41 also has formed on the outside surface thereof a longitudinal wiring trough 41b.

As is shown in FIGS. 4, 5 and 6 the various delicate logging components or elements 41a are embedded within the bodies 41. The components 41a may, for example, be semi-conductor devices such as, for example, transistors, diodes, etc. As indicated the various semi-conductor devices 41a are interconnected by conductors 41c which are shown diagramatically in FIG. 4. The conductors 41c being likewise embedded in the dielectric elastic bodies 41. Also embedded in at least one of the bodies 41 is a group of batteries such as, for example, a series connected group of mercury cells 41d. This group of cells serves as a local power supply. As shown in FIG. 4 the batteries 41d are connected with the semi-conductor components 41a via conductors 41e which run from the components 41a to the batteries 41d in the wiring trough 41b provided in the external surface of the cylinders 41. The embedded semi-conductor 41a and groups of batteries 41d are only illustrated in two of the bodies 41. However, it is to be understood that the other bodies 41 contain like components although as such they are not illustrated.

As shown stacks of the cylindrical bodies 41 are separated from each other by steel discs 43. The discs 43 have a plurality of apertures therethrough, which apertures are designated by the reference number 43b. The discs 43 have grooves 43a machined in the periphery thereof. The grooves 43a register with the grooves 41b in the bodies 41 to complete a wiring trough. As shown in FIG. 4 and as suggested at FIG. 6, the stack of cylindrical bodies 41 together with the discs 43 form a unitary rather long cylindrical body. The long cylindrical body comprised of the bodies 41 and discs 43 are as shown squeezed between the two sleeves 32a and 32b. Thus the pressure directed radially inward against the bodies by the sleeves 32a and 32b tends to hold the stacked bodies 41 in place.

As indicated, screws 39 pass through the holes 39a in the sleeves 32a and 32b and are received in the discs 43. In their unsqueezed state the cylindrical bodies 41 are of larger diameter than the discs 43 and after compression between the sleeves as indicated in FIGS. 4 and 5, the bodies 41 have substantially the same diameter as the discs 43. The discs 43 serve to compartment the various stacks of cylinders 41 or modules and in addition the holes 43b permit electrical conductors to pass from one compartment to the next.

As shown in FIG. 2b the transducer signal processing circuitry comprising semi-conductor devices, batteries, etc., are housed within the capsule 64 in the same manner as the electronic components, batteries, etc. are housed in capsule 16. The tubular container designated generally by the reference number 80 is comprised of two sleeves, 80a and 80b, which are the same as sleeves 32a and 32b hereinbefore discussed. The screws 83 are used for fastening the sleeves to steel spacer discs. The various components are housed in a plurality of cylindrical bodies of dielectrical elastic material designated generally by the reference number 85.

The advantages of using the sleeves 32a, 32b, 80a and 80b together with the discs 43 are: a greater strength to weight ratio is achieved due to increased moment of inertia; ease of manufacture and assembly; it allows a better method of mounting the components; makes it rather simple to change instrumentation as necessary. Moreover, inasmuch as the various components are embedded in the matrix of dielectric elastic material, they are well protected from damage due to vibration. In addition, mercury cells embedded in the aforesaid matrix, if ruptured, the contents thereof would not be able to damage the sensitive components.

While a specific embodiment of the invention has been shown and described in detail to illustrate the application of the principles of the invention it will be understood that the invention may be embodied otherwise without departing from such principles.

What is claimed is:

1. Apparatus, for logging various parameters in an earth borehole as the borehole is being drilled, comprising:

a drill string having a lower end thereof;

first, second and third elongated hollow subs, each of the subs having an upper and lower end, the upper end of the first sub being coupled to the lower end of the drill string, the upper end of the second sub being coupled to the lower end of the first sub and the upper end of the third sub being coupled to the lower end of the second sub;

a drill bit coupled to the lower end of the third sub;

first and second elongated capsules, said first capsule being located coaxially within the first sub, said second capsule being located coaxially within the second sub;

a first plurality of longitudinal members, each of which is welded longitudinally along an outside surface of the first sub and to the first capsule whereby the first capsule is supported along substantially its entire length within the first sub;

a second plurality of longitudinal members, each of which is welded longitudinally along an outside surface of the second capsule and to the second sub whereby the second capsule is supported along substantially its entire length within the second sub;

a conduit for providing communication between the first and second capsules and logging equipment contained in said capsules, said conduit having an end thereof which is externally threaded and an opposite end which is threadless, said first capsule having an internally threaded aperture therethrough which receives the externally threaded end of the conduit thereby providing a rigid connection between the conduit and first capsule, said second capsule having a threadless aperture therethrough which receives the threadless end of the conduit thereby providing a longitudinally non-rigid friction fit connection between the conduit and second capsule;

transducer means mounted on the third sub for detecting at least one parameter in the borehole and providing a signal representative of said parameters;

a recording unit located in said first capsule;

a first plurality of cylindrical bodies, each body being comprised of a dielectric elastomer and serving as a matrix within which there is embedded delicate electronic components, said bodies being stacked end to end to form a relatively long first cylindrical body;

means for electrically interconnecting said electronic components in said bodies and said recording unit;

a first pair of long rigid sleeves, each sleeve having a generally semi-circular cross section, said first pair of sleeves being arranged to form a longitudinally split generally cylindrical housing within which said first cylindrical body is contained under radial compression;

said cylindrical housing containing said first cylindrical body under pressure being mounted within said first capsule;

a second plurality of cylindrical bodies, each said body being comprised of a dielectric elastomer and serving as a matrix within which there is embedded delicate electronic components, said bodies being stacked end to end to form a relatively long second cylindrical body;

means for electrically interconnecting said electronic components;

a second pair of long rigid sleeves, each having a generally semi-circular cross section, said second pair of sleeves being arranged to form a longitudinally split generally cylindrical housing within which said second cylindrical body is contained under radial compression;

said second cylindrical housing containing said second cylindrical body under pressure being mounted within said second capsule;

means electrically interconnecting the electronic components of said first and second cylindrical bodies; said means passing through said conduit;

and, means for translating the signal provided by the transducer means to the second capsule and to the electronic components therein.

References Cited

UNITED STATES PATENTS

| | | | |
|---|---|---|---|
| 2,683,767 | 7/1954 | Cunningham | 174—52.6 |
| 2,832,012 | 4/1958 | Kleason et al. | 317—99 |
| 2,976,806 | 3/1961 | Risk et al. | 317—101 XR |
| 3,020,471 | 2/1962 | Barringer | 324—4 XR |
| 3,105,934 | 10/1963 | Barringer | 324—4 |
| 3,124,742 | 3/1964 | Schneider | 324—6 XR |
| 3,134,069 | 5/1964 | Clements et al. | 324—1 XR |
| 3,141,999 | 7/1964 | Schneider | 317—101 XR |
| 3,201,655 | 8/1965 | Bradt et al. | 174—52.6 XR |
| 3,293,542 | 12/1966 | Piety | 324—10 |
| 3,299,403 | 1/1967 | Young | 317—101 XR |

GERARD R. STRECKER, Primary Examiner

U.S. Cl. X.R.

174—52